(12) United States Patent
Thompson (10) Patent No.: US 11,943,314 B2
(45) Date of Patent: Mar. 26, 2024

(54) CACHE RETRIEVAL BASED ON TIERED DATA

(71) Applicant: NetApp, Inc., Sunnyvale, CA (US)

(72) Inventor: Cheryl Thompson, Sunnyvale, CA (US)

(73) Assignee: NETAPP, INC., San Jose, CA (US)

( * ) Notice: Subject to any disclaimer, the term of this patent is extended or adjusted under 35 U.S.C. 154(b) by 311 days.

(21) Appl. No.: 16/825,946

(22) Filed: Mar. 20, 2020

(65) Prior Publication Data

US 2021/0297500 A1   Sep. 23, 2021

(51) Int. Cl.
*H04L 67/568* (2022.01)
*G06F 3/06* (2006.01)
*G06F 12/0866* (2016.01)

(52) U.S. Cl.
CPC .......... *H04L 67/568* (2022.05); *G06F 3/0605* (2013.01); *G06F 3/0638* (2013.01); *G06F 3/067* (2013.01); *G06F 12/0866* (2013.01)

(58) Field of Classification Search
CPC . H04L 67/2842; G06F 3/0605; G06F 3/0638; G06F 3/067; G06F 12/0866
See application file for complete search history.

(56) References Cited

U.S. PATENT DOCUMENTS

| | | | |
|---|---|---|---|
| 8,832,330 B1* | 9/2014 | Lancaster | G06F 3/067 710/18 |
| 10,042,768 B1* | 8/2018 | Karnowski | G06F 12/0875 |
| 2005/0210203 A1* | 9/2005 | Stenstrom | G06F 12/0831 711/144 |
| 2005/0262103 A1* | 11/2005 | Stakutis | G06F 16/176 |
| 2014/0032850 A1* | 1/2014 | Phelan | G06F 12/0873 711/135 |
| 2015/0254196 A1* | 9/2015 | Sukonik | H04L 45/30 709/212 |
| 2017/0235485 A1* | 8/2017 | Davis | G06F 3/0674 711/113 |
| 2019/0129855 A1* | 5/2019 | Kelly | G06F 12/0868 |

* cited by examiner

*Primary Examiner* — Prasith Thammavong
(74) *Attorney, Agent, or Firm* — HAYNES AND BOONE, LLP (57) ABSTRACT

A system, method, and machine-readable storage medium for retrieving data are provided. In some embodiments, a cache may receive a request for data from a client. The cache may determine that a first subset of the data is stored on a storage device and that a second subset of the data is stored at a cloud address located at a cloud storage endpoint. The cache may also receive from the storage device the first subset of data. The cache further receives from the cloud storage endpoint the second subset of data in response to transmitting a request for the second subset of data stored at the cloud address to the cloud storage endpoint. The cache then transmits to the client the first and second subsets of data from the various sources in response to the data request.

1 Claim, 5 Drawing Sheets

FIG. 5

CACHE RETRIEVAL BASED ON TIERED DATA

TECHNICAL FIELD

The present description relates to caching objects, and more specifically, to a system, method, and machine-readable storage medium for retrieving objects in a distributed storage system for cost savings, efficiency, and/or load balancing.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers to provide data and manage its flow. Storage nodes or servers in storage networks generally store data across multiple data storage devices that together include a data container, which may also be referred to herein as an aggregate. Storage nodes may employ various forms of local data storage devices, such as hard disk drives, solid state drives, flash drives, or tape devices, as well as remote data storage devices, such as cloud storage devices or repositories, for example.

The data storage devices may host one or more data stores or volumes within the aggregates, which are associated with file systems that define an overall logical arrangement of storage space in a storage network. Volumes can be established to have tiering policies to store data in multiple performance tiers. For example, composite aggregates can include volumes that span relatively high-performance flash data storage devices and relatively low performance cloud storage devices for warmer and colder data, respectively.

To improve performance of a storage network, a cache volume located on a storage node may act as a cache for an origin volume that is located on a different storage node. The cache volume may be used to, for example, speed access to remote data and/or to offload traffic from heavily accessed volumes. For example, a cache volume may directly serve read requests if it contains the data requested by a client. If the cache volume does not contain the requested data, the cache volume may request the data from the origin volume and store the data in the cache volume before serving the client request. Subsequent read requests for the data may then be served directly from the cache volume. While caching data can reduce latency for responding to client requests, current approaches have limitations in their ability for reducing latency for clients storing content in the distributed storage system.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments, unless noted otherwise. Finally, in view of this disclosure, features described in relation to one aspect or embodiment may be applied to other disclosed aspects or embodiments of the disclosure, even though not specifically shown in the drawings or described in the text.

Customers may want to store data from a small edge data center into the cloud and then access that data from one or more of their other data centers. As the pool of data in the cloud grows, interest in leveraging it for a variety of projects across a geographically distributed organization may grow. To allow customers to have easy and fast access to their data, caches may be provided for prioritizing retention of the working dataset (e.g., most recently used data). A cache may work in operation with a data fabric technology that enables automated tiering of data to low-cost object storage tiers either on or off premises.

If the cache receives a request for data and the data is not stored in the cache (e.g., cache miss), then the cache may fetch the data from an origin source. The origin source may be part of the data fabric technology that enables data tiering out to the cloud. If a portion of the requested data is tiered out the cloud, the origin source may read the data from the cloud and then return the data to the cache. If a first subset of the requested data is stored at the origin source and a second subset of the requested data is stored at the cloud storage endpoint, then it may be desirable to allow the cache to retrieve the first subset from the origin source and the second subset from the cloud storage endpoint. Accordingly, the cache may access and retrieve the data from multiple locations (e.g., the cloud storage endpoint and the origin volume).

The present application provides techniques for a cache to retrieve data from the origin volume/or and from the cloud storage endpoint to satisfy a single data request. An infrastructure that would enable such data retrieval may provide improved performance by providing load distribution, reduced latency by locating data closer to the point of client access, and/or enhanced availability by serving cached data in a network disconnection situation.

Figure 1:
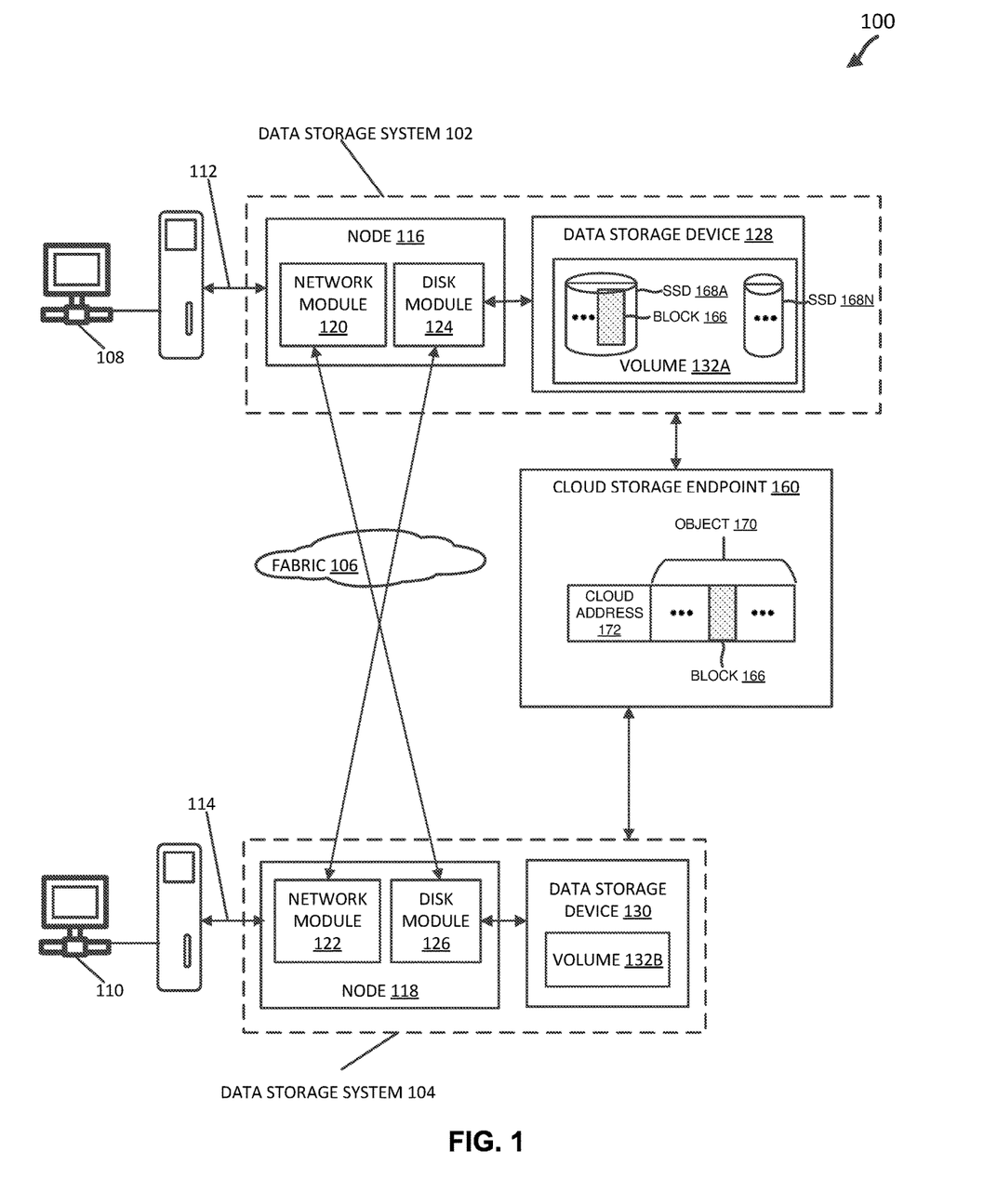
FIG. 1 is a schematic diagram of a computing architecture according to one or more aspects of the present disclosure.

FIG. 1 is a block diagram illustrating a clustered network environment 100 in accordance with one or more aspects of the present disclosure. The clustered network environment 100 includes data storage systems 102 and 104 that are coupled over a cluster fabric 106, such as a computing network embodied as a private InfiniBand, Fiber Channel (FC), or Ethernet network facilitating communication between the data storage systems 102 and 104 (and one or more modules, components, etc. therein, such as, nodes 116 and 118, for example). The data storage systems 102 and 104 may be computing devices that interact with other components via, for example, the cluster fabric 106. It will be appreciated that while two data storage systems 102 and 104 and nodes 116 and 118 are illustrated in FIG. 1, any suitable number of such components is contemplated.

In an example, nodes 116, 118 include storage controllers (e.g., node 116 may include a primary or local storage controller and node 118 may include a secondary or remote storage controller) that provide client devices, such as host devices 108 and 110, with access to data stored within data storage devices 128 and 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in an embodiment a clustered network can be distributed over a plurality of storage systems and/or nodes located in a plurality of geographic locations; while in an embodiment a clustered network can include data storage systems (e.g., 102, 104) residing in a same geographic location (e.g., in a single onsite rack of data storage devices).

In the example illustrated in FIG. 1, one or more host devices 108, 110 which may include, for example, client devices, personal computers (PCs), computing devices used for storage (e.g., storage servers), and other computers or peripheral devices (e.g., printers), are coupled to the respective data storage systems 102, 104 by storage network connections 112, 114. A network connection 112, 114 may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as AMAZON S3®, etc.

The host devices 108, 110 may be general-purpose computers running applications, and may interact with the data storage systems 102, 104 using a client/server model for exchange of information. For example, the host device 108 may request data from the data storage system 102, 104 (e.g., data on a storage device managed by a network storage control configured to process I/O commands issued by the host device for the storage device), and the data storage system 102, 104 may return results of the request to the host device via the storage network connection 112, 114.

The nodes 116, 118 on clustered data storage systems 102, 104 may include network or host nodes that are interconnected as a cluster to provide data storage and management services, such as to an enterprise having remote locations, cloud storage (e.g., a cloud storage endpoint 160 may be stored within a data cloud), etc., for example. Such a node in the clustered network environment 100 may be a device attached to the network as a connection point, redistribution point or communication endpoint, for example. A node may send, receive, and/or forward information over a network communications channel, and may include any device that meets any or all of these criteria. An example of a node may be a data storage and management server attached to a network, where the server may include a general purpose computer or a computing device particularly configured to operate as a server in a data storage and management system.

In an example, a first cluster of nodes such as the nodes 116, 118 (e.g., a first set of storage controllers configured to provide access to a first storage aggregate including a first logical grouping of one or more storage devices) may be located on a first storage site. A second cluster of nodes, not illustrated, may be located at a second storage site (e.g., a second set of storage controllers configured to provide access to a second storage aggregate including a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 may include various functional components that coordinate to provide a distributed storage architecture for the cluster. For example, the nodes may include network modules 120, 122 and disk modules 124, 126. The network modules 120, 122 may be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 may provide connections with one or more other components through the cluster fabric 106. For example, in FIG. 1, the network module 120 of the node 116 may access a second data storage device by sending a request through the disk module 126 of the node 118.

Disk modules 124, 126 may be configured to connect one or more data storage devices 128, 130, such as disks or arrays of disks, flash memory, or some other form of data storage, to the nodes 116, 118. The nodes 116, 118 may be interconnected by the cluster fabric 106, for example, allowing respective nodes in the cluster to access data on data storage devices 128, 130 connected to different nodes in the cluster. Disk modules 124, 126 may communicate with the data storage devices 128, 130 according to the SAN protocol, such as SCSI or FCP, for example. As seen from an operating system on nodes 116, 118, the data storage devices 128, 130 may appear as locally attached to the operating system. Accordingly, different nodes 116, 118, etc. may access data blocks through the operating system, rather than expressly requesting abstract files.

It should be appreciated that, while the clustered network environment 100 illustrates an equal number of network and disk modules, other embodiments may include a differing number of these modules. For example, there may be a plurality of network and disk modules interconnected in a cluster that does not have a one-to-one correspondence between the network and disk modules. That is, different nodes may have a different number of network and disk modules, and the same node may have a different number of network modules than disk modules.

Further, host devices 108, 110 may be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 may return results of the requested services to the host devices 108, 110. In an embodiment, the host devices 108, 110 may exchange information with the network modules 120, 122 residing in the nodes 116, 118 (e.g., network hosts) in the data storage systems 102, 104.

In an embodiment, the data storage devices 128, 130 include volumes 132, which may include an implementation of storage of information onto disk drives or disk arrays or other storage (e.g., flash) as a file system for data, for example. In an example, a disk array may include all traditional hard drives, all flash drives, or a combination of traditional hard drives and flash drives. Volumes may span a portion of a disk, a collection of disks, or portions of disks, for example, and typically define an overall logical arrangement of file storage on disk space in the storage system. In an embodiment a volume may include stored data as one or more files that reside in a hierarchical directory structure within the volume.

Volumes are typically configured in formats that may be associated with particular storage systems, and respective volume formats typically include features that provide functionality to the volumes, such as providing an ability for volumes to form clusters. For example, a first storage system may utilize a first format for their volumes, and a second storage system may utilize a second format for their volumes, where the first and second formats are different from each other.

In the clustered network environment 100, the host devices 108, 110 may utilize the data storage systems 102, 104 to store and retrieve data from the volumes 132. For example, the host device 108 may send data packets to the network module 120 in the node 116 within data storage system 102. The node 116 may forward the data to the data storage device 128 using the disk module 124, where the data storage device 128 includes a volume 132A. In this example, the host device 108 may access the volume 132A, to store and/or retrieve data, using the data storage system 102 connected by the storage network connection 112. Further, the host device 110 may exchange data with the network module 122 in the node 118 within the data storage system 104 (e.g., which may be remote from the data storage system 102). The node 118 may forward the data to the data storage device 130 using the disk module 126, thereby accessing volume 132B associated with the data storage device 130. While host device 108 is illustrated as communicating with data storage system 102, and similarly host device 110 with data storage system 104, the host devices 108, 110 may communicate via the network (e.g., via fabric 106) with other storage systems without requiring traversal through storage systems 102, 104 respectively (as just one example). Thus, if storage system 102 is down, then the host device 108 may still access data via storage system 104 or some other cluster at another site.

The data storage system 102, 104 may further provide automated tiering of data to lower-cost object storage tiers either on or off premises to aid in lowering the cost of storage. For example, the data storage system 102, 104 may deliver the benefits of cloud economies by tiering to the cloud storage endpoint 160 (e.g., public clouds and/or private clouds). The data storage system 102, 104 may be associated with a cloud tier including a cloud storage endpoint 160. The cloud storage endpoint 160 may be an external object store that is associated with a local tier (e.g., the data storage device 128 including the volume 132A), creating a composite collection of discs. The external object store may store one or more objects. The term "object" may refer to a chunk of data (having one or more blocks of data and/or metadata) that is written together in an object storage tier. Additionally or alternatively, the term "object" may refer to content or a data object. The cloud storage endpoint 160 may store cloud objects in any size. In some examples, the cloud storage endpoint 160 may store data as 4K blocks, and each object stored in the cloud storage endpoint 160 may be composed of 1,024 4 kilobyte (KB) blocks.

To illustrate an example, the node 116 may tier data stored in the volume 132A to the cloud storage endpoint 160. For example, the node 116 may identify infrequently used data stored in the volume 132A and move that data to a lower-cost object storage in the cloud storage endpoint 160, leaving frequently used data on the higher-performing, data center storage system. For example, the frequently used data may remain in high-performance solid state drive (SSDs) or hard disk drives (HDDs) of the volume 132A, allowing the system to reclaim space on the primary storage (e.g., volume 132A). Although the examples provided may discuss a volume including one or more SSDs and may discuss SSD addresses, it should be understood that this discussion extends to a volume including one or more HDDs and HDD addresses.

Volumes may take advantage of the tiering by keeping active ("hot") data on the local tier and tiering inactive ("cold") data to the cloud storage endpoint 160. The volume 132A may include one or more SSDs 168 (e.g., SSD 168A, . . . , 168N). When a block 166 is written to an SSD 168A of the volume 132A, the node 116 may assign the block a temperature value indicating that it is hot. Over time, the node 116 may scan the blocks stored in the SSD 168 (e.g., SSD 168A, . . . , SSD 168N) and based on the tiering policies, may keep the scanned block as hot (indicating that the block is frequently accessed), may change the block from hot to cool (indicating that the block is infrequently accessed), may mark cold blocks for tiering to the cloud storage endpoint 160, and/or may tier marked blocks to the cloud storage endpoint 160.

The node 116 may concatenate marked blocks stored on the volume 132A (e.g., SSD 168A, . . . , SSD 168N) into an object 170 and when the number of blocks in the object 170 reaches a threshold number (e.g., 1,024), the node 116 may write the object 170 to the cloud storage endpoint 160. After the block 166 is moved to the cloud storage endpoint 160, the block 166 may be removed from the SSD 168A. As shown in FIG. 1, the object 170 is stored at a cloud address 172 and includes a plurality of blocks including the block 166.

The node 116 may continue to scan blocks stored in the volume 132A to determine whether to tier data stored in the volume 132A out to the cloud storage endpoint 160. Although the following example describes the data storage system 102 tiering data from the volume 132A to the cloud storage endpoint 160, it should be understood that the data storage system 104 may perform similar actions as those discussed in the present disclosure in relation to the data storage 102 to tier data from the volume 132B to the cloud storage endpoint 160 or to another cloud storage endpoint (or other cluster) not shown.

Figure 2:
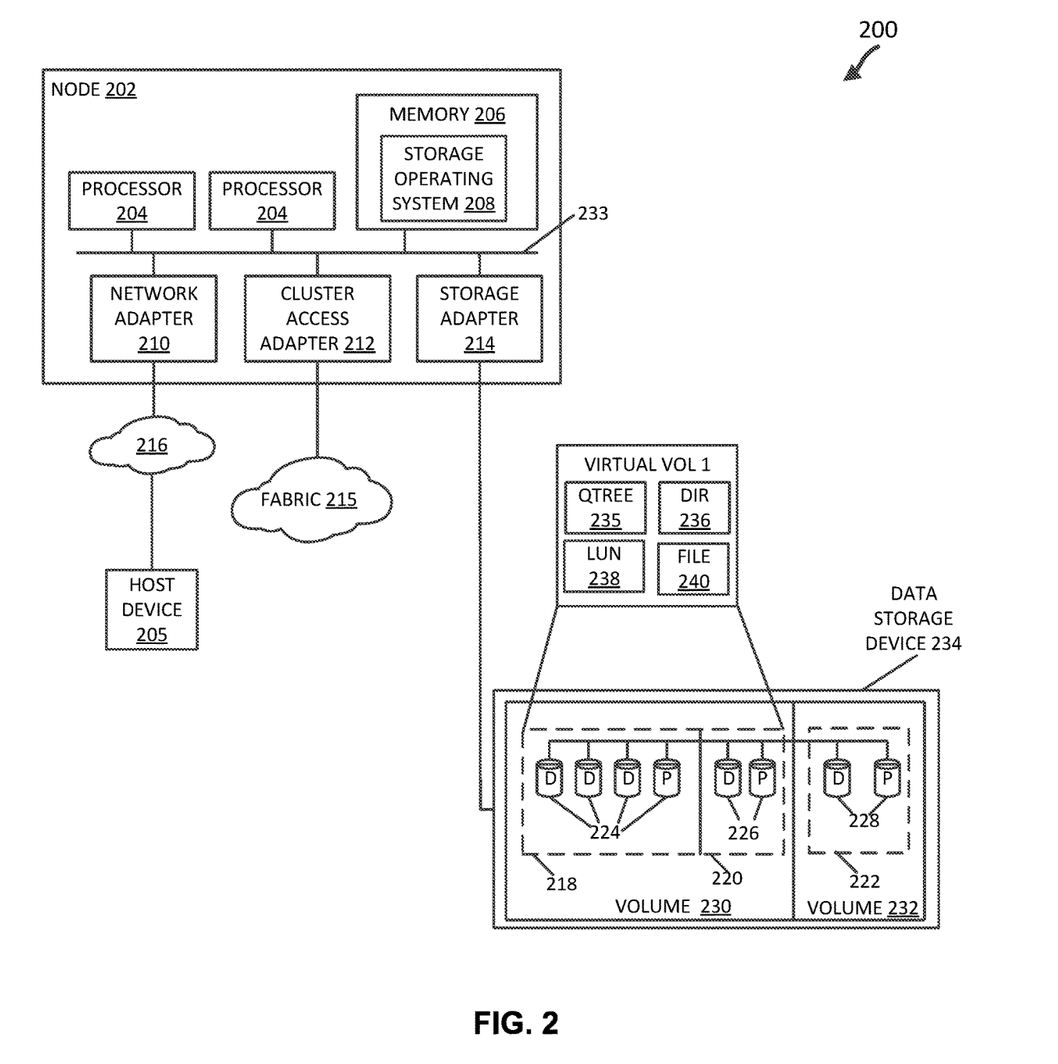
FIG. 2 is an illustrative example of a data storage system in accordance with one or more aspects of the present disclosure.

FIG. 2 is an illustrative example of a data storage system 200 (e.g., data storage system 102, 104 in FIG. 1), in accordance with one or more aspects of the present disclosure. The data storage system 200 includes a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., host device 108, 110 in FIG. 1) may be connected to the node 202 over a network 216, for example, to provide access to files and/or other data stored on the data storage device 234. The node 202 may include a storage controller that provides client devices, such as the host device 205, with access to data stored within data storage device 234.

The data storage device 234 can include mass storage devices, such as disks 224, 226, 228 of a disk array 218, 220, 222. It will be appreciated that the techniques and systems, described herein, are not limited by the example illustrated in FIG. 2. For example, disks 224, 226, 228 may include any type of mass storage devices, including but not limited to magnetic disk drives, flash memory (e.g., SSDs), and any other similar media adapted to store information, including, for example, data (D) and/or parity (P) information.

The node 202 includes one or more processors 204, a memory 206, a network adapter 210, a cluster access adapter 212, and a storage adapter 214 interconnected by a system bus 242. The network adapter 210 may correspond to and/or be an example of the network module 120 in FIG. 1. The storage adapter 214 may correspond to and/or be an example of the disk module 124 in FIG. 1. The data storage system 200 also includes an operating system 208 installed in the memory 206 of the node 202 that can, for example, implement a Redundant Array of Independent (or Inexpensive) Disks (RAID) optimization technique, or error correction coding (to name just a few examples), to optimize a reconstruction process of data of a failed disk in an array. The operating system 208 may manage communications for the data storage system 200, and communications between other data storage systems that may be in a clustered network, such as attached to a cluster fabric 215 (e.g., cluster fabric 106 in FIG. 1). Thus, the node 202, such as a network storage controller, can respond to host device requests to manage data on the data storage device 234 (e.g., or additional clustered devices) in accordance with these host device requests.

The operating system 208 may include several modules or "layers" executed by one or both of the network module 120 or the disk module 124. These layers may include a file system 240 that keeps track of a hierarchical structure of the data stored in the storage devices and manages read/write operations (e.g., executes read/write operations on storage in response to client requests). The operating system 208 may establish one or more file systems on the data storage system 200, where a file system can include software code and data structures that implement a persistent hierarchical namespace of files and directories, for example. The file system may logically organize stored information as a hierarchical structure for files/directories/objects at the storage devices. Each "on disk" file may be implemented as a set of blocks configured to store information, such as text, whereas a directory may be implemented as a specially formatted file in which other files and directories are stored. These data blocks may be organized within a volume block number (VBN) space that is maintained by a file system of the storage operating system 208. The file system may also assign each data block in the file a corresponding "file offset" or a file block number (FBN). The file system may assign sequences of FBNs on a per-file basis, whereas VBNs may be assigned over a larger volume address space. The file system may organize the data blocks within the VBN space as a logical volume. The file system may be composed of a contiguous range of VBNs from zero to n, for a file system of size n–1 blocks, where n is a number greater than 1. In an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 may include storage locations that are addressable by the processors 204 and network adapter 210, cluster access adapter 212, and/or storage adapter 214 for storing related software application code and data structures. The processors 204, the network adapter 210, the cluster access adapter 212, and/or the storage adapter 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent that other processing and memory mechanisms, including various computer readable media, may be used for storing and/or executing application instructions pertaining to the techniques described herein. For example, the operating system may also utilize one or more control files (not shown) to aid in the provisioning of virtual machines.

The network adapter 210 includes the mechanical, electrical and signaling circuitry for connecting the data storage system 200 to the host device 205 over the network 216, which may include, among other things, a point-to-point connection or a shared medium, such as a LAN. The network adapter 210 may also connect the data storage system 200 to the cloud tier (e.g., cloud storage endpoint 160 in FIG. 1). The host device 205 may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information may be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information may be retrieved by the storage adapter 214 and, in some examples, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215). In some examples, the network adapter 210 may format the information into a data packet and forward the data packet to the cloud tier (e.g., cloud storage endpoint 160 in FIG. 1).

In an embodiment, storage of information on disk arrays 218, 220, 222 can be implemented as one or more storage volumes 230, 232 that include a cluster of disks 224, 226, 228 defining an overall logical arrangement of disk space. The disks 224, 226, 228 that include one or more volumes may be organized as one or more groups of RAIDs (while in other examples, error correction coding may be used). As an example, volume 230 includes an aggregate of disk arrays 218 and 220, which include the cluster of disks 224 and 226. In an example, to facilitate access to disks 224, 226, 228, the operating system 208 may implement a file system (e.g., write anywhere file system) that logically organizes the information as a hierarchical structure of directories and files on the disks. Accordingly, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example. A physical volume corresponds to at least a portion of physical storage devices whose address, addressable space, location, etc. does not change, such as at least some of one or more data storage devices 234 (e.g., a Redundant Array of Independent (or Inexpensive) Disks (RAID system)). In some examples, the location of the physical volume does not change in that the (range of) address(es) used to access it may generally remain constant. A virtual volume, in contrast, may be stored over an aggregate of disparate portions of different physical storage devices. The virtual volume may be a collection of different available portions of different physical storage device locations, such as some available space from each of the disks 224, 226, and/or 228, and is not "tied" to any one particular storage device. Accordingly, a virtual volume may be said to include a layer of abstraction or virtualization, which allows it to be resized and/or flexible in some regards.

Further, a virtual volume may include one or more logical unit numbers (LUNs) 238, directories 236, and/or Qtrees 235. Among other things, these features may allow the disparate memory locations within which data is stored to be identified, for example, and grouped as a data storage unit. For example, the LUNs 238 may be characterized as constituting a virtual disk or drive upon which data within the virtual volume may be stored within the aggregate. LUNs may be referred to as virtual drives, such that they emulate a hard drive from a general purpose computer, while they actually include data blocks stored in various parts of a volume.

One or more data storage devices 234 may have one or more physical ports, where each physical port may be assigned a target address (e.g., SCSI target address). To represent respective volumes stored on a data storage device, a target address on the data storage device 234 may be used to identify one or more LUNs 238. For example, when the node 202 connects to a volume 230, 232 through the storage adapter 214, a connection between the node 202 and the one or more LUNs 238 underlying the volume is created. Additionally or alternatively, respective target addresses may identify multiple LUNs, such that a target address may represent multiple volumes. The I/O interface, which may be implemented as circuitry and/or software in the storage adapter 214 or as executable code residing in memory 206 and executed by the processors 204, for example, may connect to volume 230 by using one or more addresses that identify the one or more LUNs 238.

Data stored in a volume (e.g., volume 230, 232) may also be stored in a cache, which may store frequently accessed portions of a source of data in a way that allows the data to be served faster and/or more efficiently than it would be by fetching the data from the source. Referring back to FIG. 1, data stored on the volume 132 may be cached at a cache volume. A cache volume may provide a remote caching capability for an origin volume (e.g., volume 132A, volume 132B, etc.), simplifying file distribution, reducing WAN latency, and/or lowering WAN bandwidth costs. In some examples, the cache volume may be beneficial in read-intensive environments where data is accessed more than once and is shared by multiple hosts.

The cache volume may be populated as the host device reads data from the origin volume. For example, the host device may request data from the cache volume. On a first read of any data, the cache volume may fetch the requested data from the origin volume. The requested data may be returned to the cache volume, stored in the cache volume, and then passed back to the host device. As reads are passed through the cache volume, the cache volume may fill up by storing the requested data. In an example, the cache volume may write the data locally in the cache volume. If the host device requests data that is stored in the cache volume, the cache volume may serve the requested data back to the host device without spending time and resources accessing the original source of the data (e.g., the original volume). Accordingly, the cache volume may serve frequently accessed data directly to the host device without fetching the data from the origin volume again.

The cache volume may serve data faster, if for example, the data storage device on which the cache volume resides is faster than the data storage device on which the origin volume resides. In an example, the cache volume may have faster storage (e.g., FC versus SATA), increased processing power, and/or increased (or faster) memory compared to the origin volume. In another example, the storage space for the cache volume may be physically closer to the host device, such that it does not take as long to reach the data. The cache volume may provide improved performance by providing load distribution, may provide reduced latency by locating data closer to the point of client access, and/or may provide enhanced availability by serving cached data in a network disconnection situation.

In some examples, the cache volume may be aware of the cloud storage endpoint 160 (in the example of FIG. 1) and retrieve at least some data from the cloud storage endpoint. For example, the cache volume may receive a request for data and satisfy the data request by retrieving a first subset of the data from the origin volume and a second subset of the data from the cloud storage endpoint 160. In this example, the cache volume may bypass requesting the second subset of data from the origin volume and request the second subset of data directly from the cloud storage endpoint 160, potentially reducing latency and the time it would take to satisfy the data request. For example, the origin volume may receive a large number of requests from host devices, and by requesting the second subset of data directly from the cloud storage endpoint 160 rather than through the origin volume, the cache volume may reduce the load on the origin volume and spread the load across portions of the network.

Figure 3:
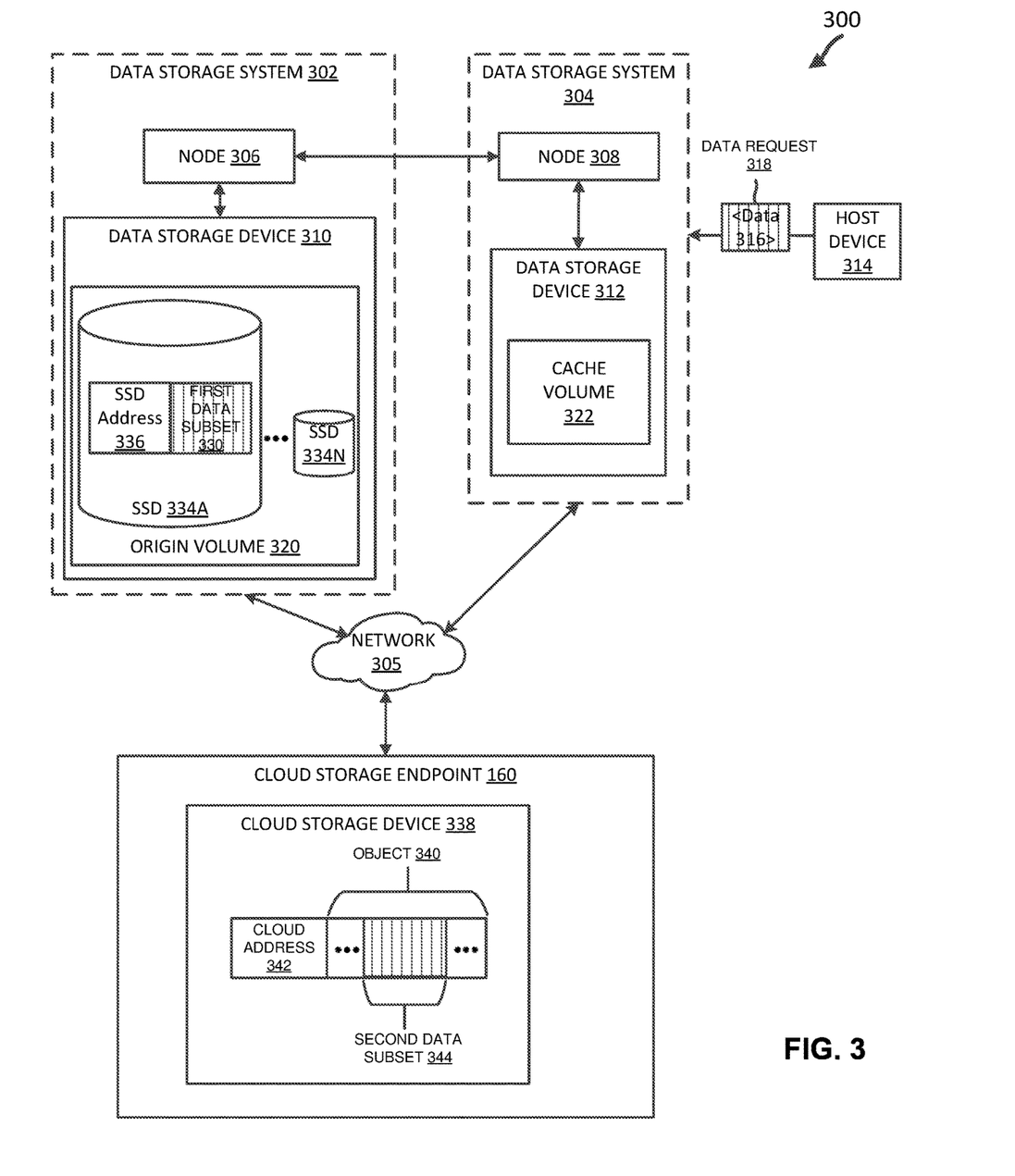
FIG. 3 is a schematic diagram of a cache volume that retrieves data from an origin volume and data from a cloud storage endpoint to satisfy a single data request according to one or more aspects of the present disclosure.

FIG. 3 is a schematic diagram 300 of a cache volume that retrieves data from an origin volume and data from a cloud storage endpoint to satisfy a single data request according to one or more aspects of the present disclosure. In the example illustrated in FIG. 3, a data storage system 302 is coupled to a data storage system 304 over a network 305. The network 305 may include, for example, a LAN or WAN. Additionally, the nodes 306 and 308 may communicate over the network 305 and/or over the cluster fabric 106 (shown in FIG. 1). The data storage system 302 and the data storage system 304 may be examples of data storage systems 102, 104 in FIG. 1 and/or data storage system 200 in FIG. 2. The data storage system 302 includes a node 306, and the data storage system 304 includes a node 308. The node 306 may be an example of node 116 in FIG. 1 and/or node 202 in FIG. 2. The node 308 that may be an example of node 118 in FIG. 1 and/or node 202 in FIG. 2. The nodes 306 and 308 may be in the same cluster or a different cluster from each other. Additionally, the node 306, 308 may allow other nodes to access data on data storage devices 310, 312. In the present disclosure, reference to a node 306 performing an action (e.g., receiving, transmitting, determining, storing, etc.) may refer to the data storage device 310 and/or the origin volume 320 performing such action. Likewise, reference to the data storage device 310 and/or the origin volume 320 performing an action may refer to the node 306 performing such action. Similarly, reference to a node 308 performing an action (e.g., receiving, transmitting, determining, storing, etc.) may refer to the data storage device 312 and/or the cache volume 322 performing such an action. Likewise, reference to the data storage device 312 and/or the cache volume 322 performing an action may refer to the node 308 performing such action.

The node 306, 308 may be coupled to data storage device 310, 312, which may be examples of data storage device 128, 130 in FIG. 1 and/or data storage device 234 in FIG. 2. The data storage device 310 includes an origin volume 320 that is mapped to a cache volume 322, with the origin volume 320 storing the original source of data. The data storage device 312 includes the cache volume 322, which may be a temporary storage location that resides between a host device 314 and the origin volume 320. The host device 314 may be an example of host devices 108, 110 in FIG. 1 and/or host device 205 in FIG. 2.

The origin volume 320 stores one or more blocks of data, and the cache volume 322 may be a destination volume that provides a remote cache of the origin volume 320. The origin volume 320 may include one or more SSDs 334 (e.g., 334A, . . . , 334N), which may refer to the local tier. The SSDs 334 may be examples of the SSDs 168A, . . . , 168N in FIG. 1 and/or the disk arrays 218, 220, 222 in FIG. 2. Each of the SSDs 334 may store data in, for example, 4K blocks. The SSD 334A stores a first data subset 330 at an SSD address 336 in the origin volume 320. The first data subset 330 may include one or more 4 KB blocks included in the data 316.

The cache volume 322 may be a writable, persistent cache of the origin volume 320 in a location remote from the data storage device 310 on which the origin volume 320 resides. The cache volume 322 may be a sparse copy of the origin volume 320 and may store a cached subset of the data stored in the origin volume 320. Storage in the cache volume 322 may be used efficiently by prioritizing retention of the working dataset (e.g., most recently used data). The cache volume 322 may use a protocol to communicate with the origin volume 320, where the protocol links the cache volume 322 to the origin volume 320. In an example, the protocol may be remote access layer (RAL), which may include a feature that enables the cache volume 322 to have a revocable read/write or read-only cache granted on an inode by the origin volume 320 to the cache volume 322.

As illustrated in FIG. 3, the cloud storage endpoint 160 may include one or more cloud storage devices 338. The cloud storage device 338 may store an object 340 at a cloud address 342 of the cloud storage device 338 in cloud storage endpoint 160. The object 340 may be an example of the object 170 in FIG. 1. The object 340 may include a plurality of blocks including a second data subset 344. The second data subset 344 may include one or more blocks (e.g., 4 KB blocks) included in the data 316 (e.g., "cold" data). As discussed above, the cache volume 322 may be populated as the host device 314 reads data from the origin volume 320.

The host device 314 may desire to retrieve the data 316 and may transmit a data request 318 for the data 316 to the node 308. The node 308 (as a cache target) may receive the data request 318 and search the cache volume 322 for the data 316. It should be understood that the data 316 may include one or more data subsets stored at the origin volume 320 and/or the cloud storage endpoint 160. The node 308 may determine, based on an identifier of the requested data, whether the requested data is stored in the cache volume 322. For example, one or more blocks included in the data 316 may be stored at the cache volume 322, one or more blocks included in the data 316 may be stored at the origin volume 320, and/or one or more blocks included in the data 316 may be stored at the cloud storage endpoint 160. In the example illustrated in FIG. 3, the cache volume 322 does not yet store any portions (or blocks) of the data 316, and the requested data 316 may include the first data subset 330 and the second data subset 344. In the illustrated example, the first data subset 330 is stored at the origin volume 320, and the second data subset 344 is stored at the cloud storage endpoint 160.

Figure 4:
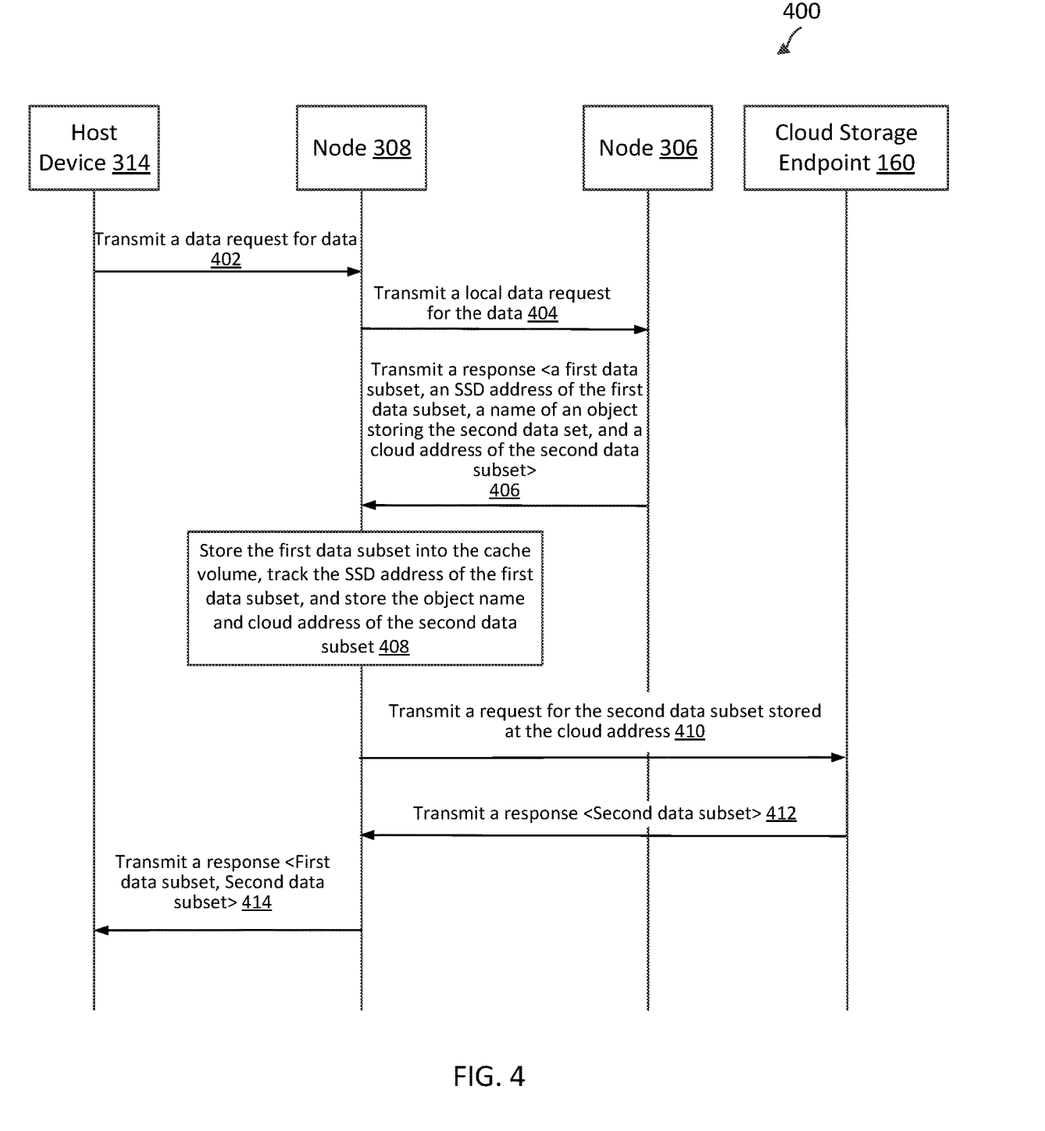
FIG. 4 is a signaling diagram illustrating a method of retrieving data from an origin volume and data from a cloud storage endpoint to satisfy a single data request according to one or more aspects of the present disclosure.

FIGS. 3 and 4 may be discussed in relation to each other to better explain data retrieval by the cache volume 322 from the origin volume 320 and the cloud storage endpoint 160. FIG. 4 is a signaling diagram illustrating a method 400 of retrieving data from an origin volume and data from a cloud storage endpoint to satisfy a single data request according to one or more aspects of the present disclosure. The method 400 may be implemented between the host device 314, the nodes 306 and 308, and the cloud storage endpoint 160 (e.g., located in the network 100). The method 400 may employ similar data retrieval techniques as described with respect to aspects of FIGS. 1, 2, 3, and/or 5. As illustrated, the method 400 includes a number of enumerated actions, but embodiments of the method 400 may include additional actions before, after, and in between the enumerated actions. In some embodiments, one or more of the enumerated actions may be omitted or performed in a different order.

At action 402, the host device 314 may transmit a data request for data. The data request transmitted at action 402 may be an example of the data request 310 for the data 316 in FIG. 3. A file stored in the cache volume 322 and/or the origin volume 320 may be implemented as a set of blocks configured to store information (e.g., text). For example, the node 306, 308 may assign each data block in the file a corresponding "file offset" or file block number (FBN). The data request 318 may include an identifier of the data 316. For example, the data request 318 may include a file handle (e.g., file identifier), a file offset, and a length value of the data 316 that together may identify the data 316. The data request 318 may be a request for X blocks (or more generally bytes) of data, where X is a positive number. The node 306, 308 may understand the same file handle, offset, and length value of the data and understand the request as being for X blocks of data in the file identified by the file handle, starting at the offset of the file and spanning the indicated length value. Data may be addressed or organized in other ways while remaining within the scope of the present disclosure.

As discussed above, the node 308 may determine whether the cache volume 322 stores a portion (e.g., one or more blocks) of the requested data 316. In response to determining that the cache volume 322 stores at least some blocks included in the requested data 316, the node 308 (e.g., a cache target) may return the applicable blocks to the host device 314. In response to determining that the cache volume 322 does not store all the blocks included in the requested data 316, the node 308 may attempt to retrieve such portions of the requested data 316 from the origin volume 320. It may be desirable to retrieve only those portions of the requested data 316 that are stored at the origin volume 320 (e.g., SSDs 334A, . . . , 334N) and request the remaining portion of the requested data 316 directly from the cloud storage endpoint 160.

Referring back to FIG. 4, at action 404, the node 308 may transmit a local data request for the data 316 to the node 306. In response to determining that the cache volume 322 does not store all the blocks included in the requested data 316, the node 308 may transmit the local data request for the data to the node 306. The node 306 may receive the local data request from the node 308.

The local data request may specify to the receiving node 306 to retrieve those portions of the requested data 316 that are stored locally at the data storage device 310 (e.g., stored in the SSDs 334A, . . . , 334N of the origin volume 320) and provide an object name of the object and one or more cloud addresses at which the remaining portion(s) of the requested data 316 are stored at the cloud storage endpoint 160. Referring back to FIG. 3, the node 306 may determine that the first data subset 330 is stored at the SSD address 336 and that the second data subset 344 (the remaining portion of the requested data 316 that is not stored in the origin volume 320) is stored at the cloud address 342 of the cloud storage endpoint 160. In an example, the SSD address 336 may be an SSD physical volume block number (PVBN) in the origin volume 320, and the cloud address 342 may be a cloud PVBN. In some examples, the file system 240 allocates blocks, frees blocks, to and from a virtual volume of an aggregate. The aggregate, as discussed above, may be a physical volume including one or more groups of storage devices, such as RAID groups, underlying one or more virtual volumes of the storage system. The aggregate may have its own PVBN space and maintain metadata, such as block allocation bitmap structures, within the PVBN space. Each virtual volume may have its own virtual volume block number (VVBN) space and may maintain metadata, such as block allocation bitmap structures, within that PVBN space. PVBNs may be used as block pointers within buffer trees of files stored in a virtual volume. Systems and methods for creating or using PVBNs are described in further detail in U.S. patent application Ser. No. 14/994,924 filed Jan. 13, 2016, entitled "METHODS AND SYSTEMS FOR EFFICIENTLY STORING DATA," which is incorporated herein by reference in its entirety.

Referring to FIG. 4, at action 406, responsive to the local data request from the node 308, the node 306 may transmit a response including the first data subset 330, an SSD address of the first data subset 330, a name of the object storing the second data subset 344, and a cloud address of the second data subset 344. Referring back to FIG. 3, an SSD address of the first data subset 330 may identify the location at which the first data subset 330 is stored at the SSD 334A. The node 306 may use the SSD address 336 of the SSD 334A to find the first data subset 330. The object name may provide an indication to the node 308 regarding how to read the object. A cloud address of the second data subset 344 may be, for example, a cloud PVBN that identifies the location at which the second data subset 344 is stored at the cloud storage endpoint 160. In some examples, the origin volume 320 may use the cloud address to retrieve the second data subset 344 from the cloud storage endpoint 160.

The node 308 may receive the response from the node 306 in relation to the action 406. Responsive to receiving the response from the node 306, the node 308 may determine that the first data subset 330 is stored at the SSD address of the SSD 334A and that the second data subset 344 is stored at the cloud address at the cloud storage device 338, which is in the cloud storage endpoint 160.

It should be understood that the node 306 may include one or more SSD addresses of the first data subset 330, one or more names of objects storing the second data subset 344, and one or more cloud addresses of the second data subset 344. Additionally, it should be understood that the node 306 may include in a response at least (but not all) the first data subset 330, an SSD address of the first data subset 330, a name of the object storing the second data subset 344, and a cloud address of the second data subset 344.

In an example, the node 306 may transmit each of the data subsets of the requested data stored at the origin volume 320 and an SSD address of each of the respective data subsets. The data 316 may also, as already noted, include one or more data subsets of the data 316 stored at the cloud storage endpoint 160. In an example, the node 306 may transmit each of the cloud addresses at which a respective data subset of the data 316 is stored at the cloud storage endpoint 160, and for each of these cloud addresses, the node 308 may transmit a request for the data stored at the respective cloud address to the cloud storage endpoint 160 (e.g., as noted at action 410 below).

Referring back to FIG. 4, at action 408, the node 308 may store the first data subset 330 into the cache volume 322 and store the object name and cloud address of the second data subset 344 into the cache volume 322. In some examples, the cache volume 322 may track the first data subset 330 by writing the data that the cache volume 322 receives at the correct offset for the inode it is attempting to fetch the data from. The cache volume 322 may determine the local address in the cache volume 322 and may disregard the origin address. The cache volume 322 may accordingly return the data to the host device 314 in response to a request from the host device 314 for the data.

In some examples, a cloud PVBN may contain a bin number (e.g., three bits) indicating that the PBVN is for the cloud storage endpoint 160, an object identifier providing a unique identifier (e.g., 34-bit value) of the object, and a slot number represented as a P-bit value (e.g., P=10). The slot number may indicate the location of a block within the object. In some examples, an object may contain 1,024 4K blocks such that 1,024 object PVBNs may have the same object identifier, but different slot numbers from each other.

An object identifier used on the origin volume 320 may already be used by an aggregate on which the cache volume 322 resides. As a result, the cache volume 322 may assign the second data subset 344 a local object identifier that identifies the second data subset 344 in the aggregate on which the cache volume 322 resides. The cache volume 322 may create a mapping from the object identifier received from the origin volume 320 to the local object identifier and save the object name under the local object identifier. The mapping may allow the cache volume 322 to determine whether it has the object name stored for other cloud addresses (e.g., cloud PVBNs) using the same object identifier received from the origin volume 320. The information about the object may then be stored under the local object identifier in the object information metafile of the cache volume 322's aggregate.

Based on receiving the cloud address, the node 308 knows where the second data subset 344 is stored at the cloud storage endpoint 160 and may directly request the second data subset 344 from the cloud storage endpoint 160. At action 410, the node 308 may transmit a request for the second data subset 408 stored at the cloud address of the cloud storage device 338 located at the cloud storage endpoint 160.

If the cache volume 322 is scheduled to read blocks directly from the cloud storage endpoint 160 but has lost connectivity to the object store, then the cache volume 322 may instead transmit to the origin volume 320 a request to fetch the block from the cloud storage endpoint 160 rather than returning an error message that the data was unavailable. In an example, if the aggregate of the mirror volume is cloud mirrored, the cache volume 322 may send the request only if connectivity was lost to both the primary and the mirror.

The cloud storage endpoint 160 may receive the request and retrieve the second data subset 344 stored at the cloud address. At action 412, responsive to receiving the request for the second data subset 344 stored at the cloud addresses, the cloud storage endpoint 160 may transmit a response including the second data subset 344 to the node 308. The node 308 may receive the response including the second data subset 344 from the node 306.

The node 308 may determine, based on a set of cloud storage policies, whether to store the second data subset 344 received from the cloud storage endpoint 160 at the cache volume 322. A user may establish the set of cloud storage policies for one or more cache volumes. For example, a cloud storage policy may specify that data associated with random reads, but not sequential reads, are to be moved back and stored in the cache volume 322. In this example, a cloud storage policy may specify that data associated with sequential reads are read, but not to be moved back and stored in the cache volume 322. If data is moved back and stored in the cache volume 322, the data may reside in both the cloud tier and in the cache volume. When the data is requested at a later point, the cache volume 322 may retrieve the data locally rather than request the data from the cloud tier.

In another example, a cloud storage policy may specify that data associated with sequential reads, but not random reads, are to be moved back and stored in the cache volume 322. In this example, a cloud storage policy may specify that data associated with random reads are read, but not to be moved back and stored in the cache volume 322. In another example, a cloud storage policy may specify that data associated with sequential reads and random reads are moved back and stored in the cache volume 322. In another example, a cloud storage policy may specify that neither data associated with sequential reads nor random reads are moved back and stored in the cache volume 322. If sequential reads of cloud data from the cache volume 322 only trigger reads from cloud and are not stored in the origin volume 320, the I/O patterns may be the same and the cache volume 322 may consume less SSD space.

If a cloud storage policy specifies the node 308 to store the second data subset 344 at the cache volume 322, then the node 308 may store the second data subset 344 at the cache volume 322. The node 308 may store the second data subset 344 to an appropriate inode offset in the cache volume 322. The node 308 may thereafter serve a request for the second data subset 344 to the host device 314 without requesting the second data subset 344 from the origin volume 320 or the cloud storage endpoint 160. Additionally, the node 308 may remove the cloud address of the second data subset 344 returned by the origin volume 320 (that had been received as part of action 406 of FIG. 4).

At action 414, responsive to the data request received in relation to action 402, the node 308 may transmit a response including the first data subset 330 and the second data subset 344 to the host device 314. In an example, the first data subset 330 and the second data subset 344 includes all of the blocks included in the requested data. In another example, the first data subset 330 and the second data subset 344 do not include all of the blocks included in the requested data. In this example, the cache volume 322 may retrieve additional data subsets of the requested data (e.g., one or more data subsets stored on the origin volume 320 and/or the cloud storage endpoint 160) using aspects discussed in the present disclosure. The node 308 may wait until it has received each of the requested blocks before transmitting the response to the host device 314.

It should be understood that the requested data 316 may include one or more data subsets stored at the origin volume 320, the cache volume 322 (e.g., fetched by the node 308 based on an earlier request), and/or the cloud storage endpoint 160. In an example, the data 316 may include the first data subset that is referred to in action 406 and may also include another data subset that is stored in the origin volume 320. In this example, the response at action 406 may also include the other data subset that is stored in the origin volume 320 along with an SSD address of the other data subset. In other words, for any given data subset that is requested by the client and stored in the origin volume 320, the node 306 may transmit the given data subset and an SSD address of the given data subset in a response to the node 308. At action 408, the node 308 may accordingly store each of the given data subsets that were stored at the origin into the cache volume and track the SSDs address of the given data subsets.

In another example, the data 316 may include the second data subset that is referred to in actions 406, 408, and 410 and that is stored at a cloud address. The data 316 may also include another cloud data subset that is stored in the cloud tier. In this example, the response at action 406 may include a name of an object storing the other cloud data subset that is stored in the cloud tier along with a cloud address of the other cloud data subset. In other words, for any given cloud data subset that is requested by the client and stored in the cloud tier, the node 306 may transmit the name of the object storing the given cloud data subset and a cloud address of the given cloud data subset in a response to the node 308.

At action 408, the node 308 may accordingly store each of the object names and the cloud addresses associated with the cloud data sets that were provided in the response. At action 410, the node 308 may accordingly transmit a request for each of the given cloud data subsets stored at their respective cloud addresses. An advantage of identifying the cloud addresses is that the node 308 may reuse these addresses to satisfy later requests from the host device 314 by retrieving data from the cloud storage endpoint 160 without requesting the data from the node 306.

As discussed above, the cache volume 322 may assign the second data subset 344 a local object identifier that identifies the second data subset 344 in the aggregate on which the cache volume 322 resides. The cache volume 322 may create a mapping from the object identifier received from the origin volume 320 to the local object identifier and save the object name under the local object identifier. An object may be stored in a filesystem and store multiple blocks (e.g., 1,024 blocks). Accordingly, many (e.g., more than 1,024 references) may point to the object from the filesystem.

The cache volume 322 may realize than an object is invalid through various means and accordingly redirect reads to the origin volume 320. In some examples, as the data stored in the origin volume 320 is tiered to the cloud storage endpoint 160, blocks of an object stored on the origin volume 320 may be removed, and the object may become fragmented. Over time, references to the object may be decrease and reach a threshold. If the number of references reaches the threshold, the node 306 may determine to free the object. To free the object, the node 306 may send a command to the cache volume 322 to invalidate its information about that object. The cache volume 322 may receive the command and in response, mark the object as invalid in the cache volume 322's aggregate object information metafile and remove the mapping entry of that object identifier received from the origin volume 320 to the local object identifier. On a subsequent read request for the object, the cache volume 322 may determine that the object is invalid, and the read may be redirected to the origin volume 320. The command to the cache volume 322 to invalidate its information about an object may be performed to speed up the redirection process and may be unnecessary for correctness. If the origin volume 320 determines that the cache volume 322 is unavailable, the origin volume 320 may proceed with freeing the object. If the cache volume 322 tries to read the object, then the cache volume 322 will receive an object not found error, mark the object as invalid in its metadata, remove the object identifier mapping, and direct the read to the origin volume 320.

In some examples, if an object is marked as invalid, the node 308 does not immediately free the object in the cache volume 322 or clean up the corresponding object information metafile because the container file may still contain object PVBNs referencing the object. If the node 308 were to free the object information, then the object identifier may be reused and those old PVBNs may direct the cache volume 322 to the wrong data. To avoid this, the cache volume 322 may wait until those stale PVBNs are freed before freeing the object information and the object identifier. To expedite this process, the node 308 may scan the cache volumes and free the PVBNs of invalid objects rather than performing tiering and defragmentation work.

In some examples, if the cache volume 322 does not receive the command to invalidate an object, then the origin volume 320 may both free and reuse an object identifier before the cache volume 322 has realized that the original object is no longer valid. While the object is reused, the name of the new object may be different because an object name may contain a monotonically increasing sequence number. If the cache volume 322 transmits a request to the origin volume 320 to fetch a block and the origin volume 320 responds with a reused object identifier, then the cache volume 322 may determine that the object identifier mapping that it has is stale by comparing the sequence number received from the origin volume 320 with the sequence number that it stored in the object information metafile for the corresponding local object identifier. If they do not match, then the node 308 may determine that the object identifier mapping is stale. The node 306 may then mark the old object as invalid in its object information metafile, allocate a new local object identifier for the new object, and update the mapping.

Figure 5:
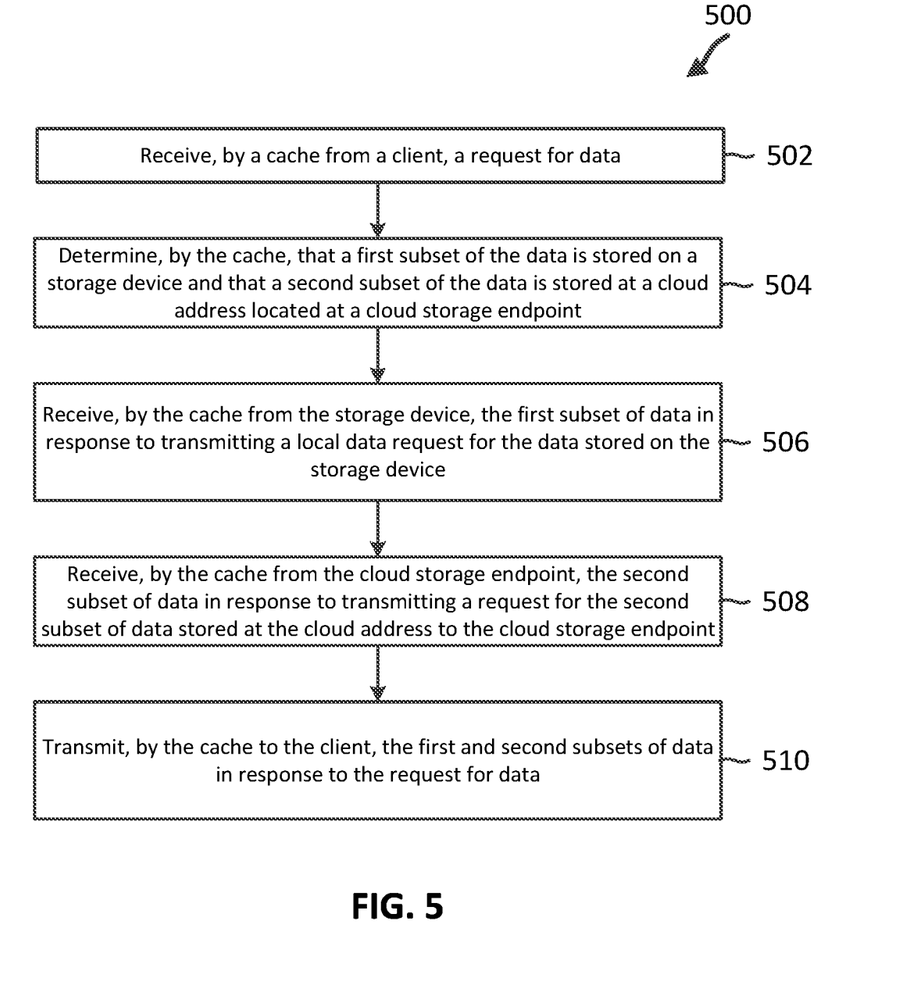
FIG. 5 is a flow diagram of a method of retrieving data from an origin volume and a from cloud storage endpoint according to one or more aspects of the present disclosure.

FIG. 5 is a flow diagram of a method 500 of retrieving data from an origin volume and from a cloud storage endpoint according to one or more aspects of the present disclosure. Blocks of the method 500 can be executed by a computing device (e.g., a processor, processing circuit, and/or other suitable component). For example, a data storage system such as the data storage system 304 may utilize one or more components, such as the node 308, data storage device 312, and/or the cache volume 322, to execute the blocks of method 500 (as also discussed above with respect to FIG. 4). As illustrated, the method 500 includes a number of enumerated blocks, but embodiments of the method 500 may include additional blocks before, after, and in between the enumerated blocks. In some embodiments, one or more of the enumerated blocks may be omitted or performed in a different order.

At block 502, the method 500 includes receiving, by a cache from a client, a request for data. At block 504, the method 500 includes determining, by the cache, that a first subset of the data is stored on a storage device and that a second subset of the data is stored at a cloud address located at a cloud storage endpoint. At block 506, the method 500 includes receiving, by the cache from the storage device, the first subset of data in response to transmitting a local data request for the data stored on the storage device. At block 508, the method 500 includes receiving, by the cache from the cloud storage endpoint, the second subset of data in response to transmitting a request for the second subset of data stored at the cloud address to the cloud storage endpoint. At block 510, the method 500 includes transmitting, by the cache to the client, the first and second subsets of data in response to the request for data.

The present embodiments can take the form of an entirely hardware embodiment, an entirely software embodiment, or an embodiment containing both hardware and software elements. Accordingly, it is understood that any operation of the computing systems of computing architecture 100 may be implemented by the respective computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include non-volatile memory including magnetic storage, solid-state storage, optical storage, cache memory, and RAM.

Thus, the present disclosure provides a system, method, and machine-readable storage medium for retrieving data in a clustered networking environment. In some embodiments, the method includes receiving, by a cache from a client, a request for data; determining, by the cache, that a first subset of the data is stored on a storage device and that a second subset of the data is stored at a cloud address located at a cloud storage endpoint; receiving, by the cache from the storage device, the first subset of data in response to transmitting a local data request for the data stored on the storage device; receiving, by the cache from the cloud storage endpoint, the second subset of data in response to transmitting a request for the second subset of data stored at the cloud address to the cloud storage endpoint; and transmitting, by the cache to the client, the first and second subsets of data in response to the request for data.

In some examples, the method also includes storing, by the cache, the cloud address and an association between the cloud address and the second subset of data. The cloud address may include a cloud PVBN. In some examples, the method also includes storing, by the cache, the first subset of the data, the first subset being stored at an SSD address of an SSD of the storage device. In some examples, the method further includes transmitting, by the cache to the storage device, the local data request indicating to the storage device to return the first subset of data to the cache and to return a cloud address at which the second subset of data is stored at the cloud storage endpoint.

In some examples, the method also includes transmitting, by the cache to the cloud storage endpoint, the request for the second subset of data stored at the cloud address. The second data subset may be stored on a cloud storage device located in the cloud storage endpoint. In some examples, receiving a request for data includes receiving, by the cache from the client, the request for one or more four kilobyte (KB) data blocks, where the first subset of data includes a first four KB data block that is stored in a first object on an SSD of the storage device, and the second subset of data includes a second four KB data block that is stored at the cloud address of the cloud storage endpoint. In some examples, the storage device includes a plurality of SSDs, and at least one SSD of the plurality stores the first subset of data.

In yet further embodiments, the non-transitory machine-readable medium has instructions for performing the method of retrieving data, including machine executable code, which when executed by at least one machine, causes the machine to: receive, by a cache from a host device, a request for data; transmit, by the cache to a storage device, a local data request specifying the storage device to return a first portion of the data stored at the storage device and to return a cloud address at which a second portion of the data is stored on a cloud storage endpoint; transmit, by the cache to the cloud storage endpoint, a request for the second portion stored at the cloud address; receive, by the cache, the first and second portions of the data; and transmit, by the cache to the host device, the first and second portions of the data in response to the request for data.

In some examples, the non-transitory machine-readable medium has instructions for performing the method of retrieving data, including machine executable code, which when executed by at least one machine, causes the machine to transmit, based on a storage policy specifying storage of data retrieved from sequential reads from the cloud storage endpoint, the second subset of data to the storage device based on whether the second data subset is based on a sequential read. In some examples, the non-transitory machine-readable medium has instructions for performing the method of retrieving data, including machine executable code, which when executed by at least one machine, causes the machine to transmit, based on a storage policy specifying storage of data retrieved from random reads from the cloud storage endpoint, the second subset of data to the storage device based on whether the second data subset is based on a random read. The cloud address may include a cloud PVBN.

In some examples, the non-transitory machine-readable medium has instructions for performing the method of retrieving data, including machine executable code, which when executed by at least one machine, causes the machine to store, by the cache, the first subset of the data, the first subset being stored at an SSD address of an SSD of the storage device. The second data subset may be stored on a cloud storage device located in the cloud storage endpoint. The cloud storage endpoint may store objects including one or more 4 KB blocks.

In yet further embodiments, the computing device includes a memory containing a machine-readable medium comprising machine executable code having stored thereon instructions for performing a method of retrieving data and a processor coupled to the memory. The processor is configured to execute the machine executable code to: receive, by a cache from a client, a request for data; determine, by the cache, that a first subset of the data is stored on a storage device and that a second subset of the data is stored at a cloud address located at a cloud storage endpoint; receive, by the cache, the first subset from the storage device and the second subset from the cloud storage endpoint; and transmit, by the cache to the client, the first and second subsets of data in response to the request for data.

In some examples, the processor may be configured to execute the machine executable code to receive, by the cache, the cloud address from the storage device. In some examples, the processor may be configured to execute the machine executable code to transmit, by the cache to the storage device, a local data request indicating to the storage device to return the first subset of data and to return a cloud address at which the second subset of data is stored at the cloud storage endpoint. In some examples, the processor may be configured to execute the machine executable code to transmit, by the cache to the cloud storage endpoint, a request for the second subset of the data stored at the cloud address after receiving the cloud address from the storage device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory machine-readable medium having stored thereon instructions for performing a method of retrieving data, comprising machine executable code which when executed by at least one machine, causes the machine to:
   receive, by a cache from a host device, a request for data, wherein the cache is external to the host device;
   transmit, by the cache to a storage device, a local data request specifying the storage device to return a first portion of the data stored at the storage device and to return a cloud address at which a second portion of the data is stored on a cloud storage endpoint;
   transmit, by the cache to the cloud storage endpoint, a request for the second portion stored at the cloud address;
   receive, by the cache, the first and second portions of the data;
   transmit, by the cache to the host device, the first and second portions of the data in response to the request for data; and
   transmit, based on a storage policy specifying storage of data retrieved from random reads from the cloud storage endpoint, the second subset of data to the storage device based on whether the second data subset is based on a random read.

* * * * *